United States Patent
Ju

(10) Patent No.: US 7,451,170 B2
(45) Date of Patent: Nov. 11, 2008

(54) RAPID AND LOW COST OF INVERSE DISCRETE COSINE TRANSFORM SYSTEM AND METHOD THEREOF

(75) Inventor: Chi-Cheng Ju, Hsin-Chu (TW)

(73) Assignee: MediaTek, Inc., Hsin-Chu (TW)

( * ) Notice: Subject to any disclaimer, the term of this patent is extended or adjusted under 35 U.S.C. 154(b) by 834 days.

(21) Appl. No.: 10/896,036

(22) Filed: Jul. 22, 2004

(65) Prior Publication Data
US 2005/0050128 A1    Mar. 3, 2005

(30) Foreign Application Priority Data
Sep. 3, 2003    (TW) .............................. 92124308 A

(51) Int. Cl.
G06F 17/14    (2006.01)
(52) U.S. Cl. ..................................... 708/402
(58) Field of Classification Search .................. 708/402
See application file for complete search history.

(56) References Cited

U.S. PATENT DOCUMENTS

| | | | |
|---|---|---|---|
| 5,636,152 A | 6/1997 | Yang et al. | |
| 5,825,420 A | 10/1998 | Yang et al. | |
| 5,854,757 A * | 12/1998 | Dierke | ......................... 708/402 |
| 5,883,823 A | 3/1999 | Ding | |
| 6,097,846 A | 8/2000 | Abe | |
| 6,137,916 A | 10/2000 | Chang et al. | |
| 6,327,602 B1 * | 12/2001 | Kim | ........................... 708/401 |
| 6,420,979 B1 | 7/2002 | Katayama | |
| 6,754,687 B1 * | 6/2004 | Kurak et al. | ................. 708/402 |

OTHER PUBLICATIONS

An Efficient Two-Dimensional inverse Discrete Cosine Transform Algorithm for HDTV Receivers Jar-Ferr Yang, Member, IEEE, Bor-Long Bai, and Shih-Chang Hsia IEEE Transactions on Circuits and Systems for Video Technology, vol. 5, No. 1, Feb. 1995.

* cited by examiner

Primary Examiner—David H Malzahn

(57) ABSTRACT

A data processing system transforms an input matrix with transform coefficients through an inverse discrete cosine transform procedure, and it consequentially obtains an output matrix. The input matrix comprises $2^N \times 2^N$ of discrete cosine transform coefficients, and the output matrix comprises $2^N \times 2^N$ of output data; both are sequentially indexed by the row and column index. The output matrix is obtained by summing up a plurality of partial output matrixes; each partial output matrix comprises a first partial sub-output matrix and at least one other partial sub-output matrix. The first partial sub-output matrix comprises a plurality of partial output data that has a predetermined symmetry characteristic. The partial output matrixes possess a number of symmetry relations. The first and other partial sub-output matrixes of each partial output matrix have one symmetry relation. The data processing system comprises a system controller, a calculating unit, a symmetry duplicator, a summation device and four summed partial sub-output matrix register.

14 Claims, 6 Drawing Sheets

RAPID AND LOW COST OF INVERSE DISCRETE COSINE TRANSFORM SYSTEM AND METHOD THEREOF

BACKGROUND OF THE INVENTION

1. Field of the Invention

The present invention relates to a data processing system; more particularly, the present invention relates to a 8-8 and 2-4-8 inverse discrete cosine transform system having the advantages of high speed calculation and low cost of production, and the method thereof.

2. Description of the Prior Art

The DV format is the standard specification for recording a digital video by a video tape recorder. Specifications, such as the IEC 61834 and the SMPTE 314M . . . etc., have been extensively used on consumer electronic products (e.g. digital camcorders).

Conventional digital video comprises a series of frames. Each frame comprises a plurality of scanning lines and is played in order and in a specific speed, such as 30 frames per second. Each frame comprises a pair of fields, and usually the number of scanning lines of each field is half of the number of scanning lines in each frame.

The DV codec of the conventional DV format compresses digital data by the well-known discrete cosine transform (DCT) procedure. First, each frame is divided into N×N pixel blocks; usually N is equal to 8. Next, during the video recording procedure, the data ($a_{h,u}$) of the pixel blocks in the time domain are transformed by the DCT procedure into DCT coefficients ($y_{x,z}$) in the frequency domain.

Please refer to FIG. 1 for the conventional inverse discrete cosine transform (IDCT) procedure. FIG. 1 is a schematic diagram of the IDCT procedure. The input matrix (A) comprises eight rows by eight columns of DCT coefficients ($a_{h,u}$), and it is sequentially indexed by the row index (h, h=0~7) and the column index (u, u=0~7). The output matrix (Y) comprises eight rows by eight columns of output data ($y_{x,z}$), and it is sequentially indexed by the row index (x, x=0~7) and the column index (z, z=0~7). The input matrix (A) and the output matrix (Y) can be expressed as follows:

$$A = \begin{bmatrix} a_{0,0} & a_{0,1} & a_{0,2} & a_{0,3} & a_{0,4} & a_{0,5} & a_{0,6} & a_{0,7} \\ a_{1,0} & a_{1,1} & a_{1,2} & a_{1,3} & a_{1,4} & a_{1,5} & a_{1,6} & a_{1,7} \\ a_{2,0} & a_{2,1} & a_{2,2} & a_{2,3} & a_{2,4} & a_{2,5} & a_{2,6} & a_{2,7} \\ a_{3,0} & a_{3,1} & a_{3,2} & a_{3,3} & a_{3,4} & a_{3,5} & a_{3,6} & a_{3,7} \\ a_{4,0} & a_{4,1} & a_{4,2} & a_{4,3} & a_{4,4} & a_{4,5} & a_{4,6} & a_{4,7} \\ a_{5,0} & a_{5,1} & a_{5,2} & a_{5,3} & a_{5,4} & a_{5,5} & a_{5,6} & a_{5,7} \\ a_{6,0} & a_{6,1} & a_{6,2} & a_{6,3} & a_{6,4} & a_{6,5} & a_{6,6} & a_{6,7} \\ a_{7,0} & a_{7,1} & a_{7,2} & a_{7,3} & a_{7,4} & a_{7,5} & a_{7,6} & a_{7,7} \end{bmatrix},$$

$$Y = \begin{bmatrix} y_{0,0} & y_{0,1} & y_{0,2} & y_{0,3} & y_{0,4} & y_{0,5} & y_{0,6} & y_{0,7} \\ y_{1,0} & y_{1,1} & y_{1,2} & y_{1,3} & y_{1,4} & y_{1,5} & y_{1,6} & y_{1,7} \\ y_{2,0} & y_{2,1} & y_{2,2} & y_{2,3} & y_{2,4} & y_{2,5} & y_{2,6} & y_{2,7} \\ y_{3,0} & y_{3,1} & y_{3,2} & y_{3,3} & y_{3,4} & y_{3,5} & y_{3,6} & y_{3,7} \\ y_{4,0} & y_{4,1} & y_{4,2} & y_{4,3} & y_{4,4} & y_{4,5} & y_{4,6} & y_{4,7} \\ y_{5,0} & y_{5,1} & y_{5,2} & y_{5,3} & y_{5,4} & y_{5,5} & y_{5,6} & y_{5,7} \\ y_{6,0} & y_{6,1} & y_{6,2} & y_{6,3} & y_{6,4} & y_{6,5} & y_{6,6} & y_{6,7} \\ y_{7,0} & y_{7,1} & y_{7,2} & y_{7,3} & y_{7,4} & y_{7,5} & y_{7,6} & y_{7,7} \end{bmatrix}.$$

Conventional IDCT procedure transforms the DCT coefficients ($a_{h,u}$) in the frequency domain, which are obtained by the DCT procedure, back to each element ($y_{x,z}$) of the output matrix (Y) in the time domain by the IDCT formulae. In the specifications of the DV format, the DCT procedure can be distinguished into two kinds; one is the 8-8 DCT mode, and the other is the 2-4-8 DCT mode. The 8-8 DCT mode is often used to process situations which have smaller variations between neighboring fields, and the 2-4-8 DCT mode is used to process situations which have larger variations between neighboring fields.

In conventional DV codec, the digital data decompressing procedures are inversed in comparison with the compressing procedures. If the DV codec detects a data stream that originally has been compressed by 8-8 DCT, the DV codec will decompress the data stream by the 8-8 inverse discrete cosine transform (IDCT). If the DV codec detects a data stream that originally has been compressed by 2-4-8 DCT, the DV codec will decompress the data stream by the 2-4-8 IDCT.

If A is the 8-8 DCT input matrix, then Y is the 8-8 output matrix, each element ($y_{x,z}$) of the output matrix (Y) will be calculated from the elements ($a_{h,u}$) of the input matrix (A) through the following formulae:

$$y_{x,z} = \sum_{h=0}^{7} \sum_{u=0}^{7} c(h)c(u) * a_{h,u} * \cos\left(\frac{(2x+1)}{16}h\pi\right) * \cos\left(\frac{(2z+1)}{16}u\pi\right)$$

wherein $$c(0) = \frac{1}{2\sqrt{2}},$$

$c(n)=\frac{1}{2}$, n is a natural number, and n=1~7.

If A is the 2-4-8 DCT input matrix, then Y is the 2-4-8 output matrix, each element ($y_{x,z}$) of the output matrix (Y) will be calculated from the elements ($a_{h,u}$) of the input matrix (A) through the following formulae:

$$y_{x,2g} = \sum_{h=0}^{7} \sum_{m=0}^{3} c(h)c(m) * [a_{h,m} + a_{h,m+4}] * \cos\left(\frac{(2x+1)}{16}h\pi\right) * \cos\left(\frac{(2g+1)}{8}m\pi\right)$$

$$y_{x,2g+1} = \sum_{h=0}^{7} \sum_{m=0}^{3} c(h)c(m) * [a_{h,m} - a_{h,m+4}] * \cos\left(\frac{(2x+1)}{16}h\pi\right) * \cos\left(\frac{(2g+1)}{8}m\pi\right)$$

wherein $$c(0) = \frac{1}{2\sqrt{2}},$$

$c(n)=\frac{1}{2}$, n is a natural number, and n=1~7; m and g are also natural numbers, and m=0~3, g=0~3.

Please refer to the U.S. Pat. No. 6,137,916 for detailed processes in which the DV codec compresses/decompresses DV format by the DCT/IDCT procedures.

Referring to FIG. 2, FIG. 2 is a schematic diagram which cumulatively sums up conventional partial output matrixes ($Y^{h,u}$) to obtain the output matrix (Y). In the IDCT procedure shown in FIG. 1, the output matrix (Y) can be taken as the result of cumulatively summing up 64 partial output matrixes ($Y^{h,u}$, h=0~7, u=0~7). Each partial output matrix ($Y^{h,u}$) consists of 8 rows by 8 columns of 64 matrix elements in total.

Each partial output matrix ($Y^{h,u}$) represents the contributions to the output matrix (Y) after the calculation of the IDCT formulae is performed on an inputted DCT coefficient ($a_{h,u}$, h=0~7, u=0~7) every time. For example, inputting $a_{0,0}$ results in obtaining the 64 matrix elements of the partial output matrix ($Y^{0,0}$); inputting $a_{0,1}$ results in obtaining the 64 matrix elements of the partial output matrix ($Y^{0,1}$). In this way, after inputting 64 DCT coefficients ($a_{h,u}$) one by one, the corresponding 64 partial output matrixes ($Y^{h,u}$) can be obtained. Finally, the 64 partial output matrixes ($Y^{h,u}$) are summed up, and a complete output matrix (Y) can be obtained.

The prior arts, such as the U.S. Pat. No. 5,636,152 and the U.S. Pat. No. 5,825,420, perform the 8-8 IDCT through the procedures mentioned above. However, when prior arts cumulatively sum up a partial output matrix, a total of 64 adders are needed to perform 64 summations. Therefore, cumulatively summing up 64 partial output matrixes requires a total of 4096 summations to be performed. The 64 adders and the 4096 summations increase the cost of the system hardware and consume much power.

Besides, other prior art such as the U.S. Pat. No. 6,420,979 adapts the conventional method of row column decomposition. The method is used to divide a two-dimensional IDCT calculation into two one-dimension IDCT calculations; after 64 results of the first one-dimension IDCT calculation have been calculated, the second one-dimension IDCT calculation can be performed. Therefore, the conventional row column decomposition extends the decompression time, and a register memory, that can sufficiently store 64 temp values, is needed. Therefore, the cost of a DV codec is increased. Besides, when performing the IDCT procedure to 8-8 and 2-4-8 DCT coefficients, the prior arts use two separate 8-8 and 2-4-8 IDCT hardware to perform the 8-8 or 2-4-8 IDCT procedure respectively; however, this method again greatly increases the cost of hardware and decreases the usage efficiency of the hardware.

Therefore, the main objective of the present invention is to provide an inverse discrete cosine transform system, which has high speed calculation and low cost of production, and the method thereof, in order to solve the problems of prior arts.

SUMMARY OF THE INVENTION

The objective of the present invention is to provide an inverse discrete cosine transform (IDCT) system and method for shortening the DV decompression time and effectively decreasing the hardware cost.

The present invention is used for transforming an input matrix (A) with a predetermined set of transforming coefficients through an inverse discrete cosine transform (IDCT) procedure and then obtaining an output matrix (Y) correspondingly. The input matrix comprises $2^N$ rows by $2^N$ columns of discrete cosine transform (DCT) coefficients ($a_{h,u}$), and it is sequentially indexed by the row index (h, h=0~$2^N$-1) and the column index (u, u=0~$2^N$-1). The output matrix also comprises $2^N$ rows by $2^N$ columns of output data ($y_{x,z}$), and it is sequentially indexed by the row index (x, x=0~$2^N$-1) and the column index (z, z=0~$2^N$-1); the output matrix is obtained by summing up a plurality of partial output matrixes. Each partial output matrix comprises a plurality of partial sub-output matrixes. Each partial sub-output matrix comprises a plurality of partial output data. The partial sub-output matrixes can be classified into a first partial sub-output matrix and at least one other partial sub-output matrix. The partial output matrixes possess a predetermined number of symmetry relations. The first partial sub-output matrixes and the other partial sub-output matrixes of each of the partial output matrixes have one of the predetermined number of symmetry relations. The data processing method comprises: first, calculating the DCT coefficients to be processed through the IDCT procedure, and obtaining a predetermined amount of partial output data of the first partial sub-output matrix corresponding to each DCT coefficient; next, based on the calculated predetermined amount of partial output data, calculating the partial output data of the first partial sub-output matrix according to the symmetry characteristic; and then, after determining the symmetry relations of each first partial sub-output matrix and the other partial sub-output matrixes, cumulatively summing up the first partial sub-output matrixes which have the same symmetry relation in respective order, so as to obtain the sums of the first sub-output matrixes; furthermore, calculating the sum of each first partial sub-output matrix by a symmetry calculating procedure to obtain the sum of a plurality of the partial sub-output matrixes, so as to completely obtain the whole output matrix.

The present invention sufficiently uses the simplified symmetry characteristics of the $2^N$-$2^N/2$-$2^{N-1}$-$2^N$ IDCT procedure to decrease the number of calculations of the IDCT procedure, thus reducing the calculating time and the needed hardware circuits, so as to obtain the goal of further shortening the DV processing time and decreasing the cost of the device.

The advantage and spirit of the invention may be understood by the following recitations together with the appended drawings.

BRIEF DESCRIPTION OF THE APPENDED DRAWINGS

which are suitable for 2-4-8 IDCT.

Figure 5:
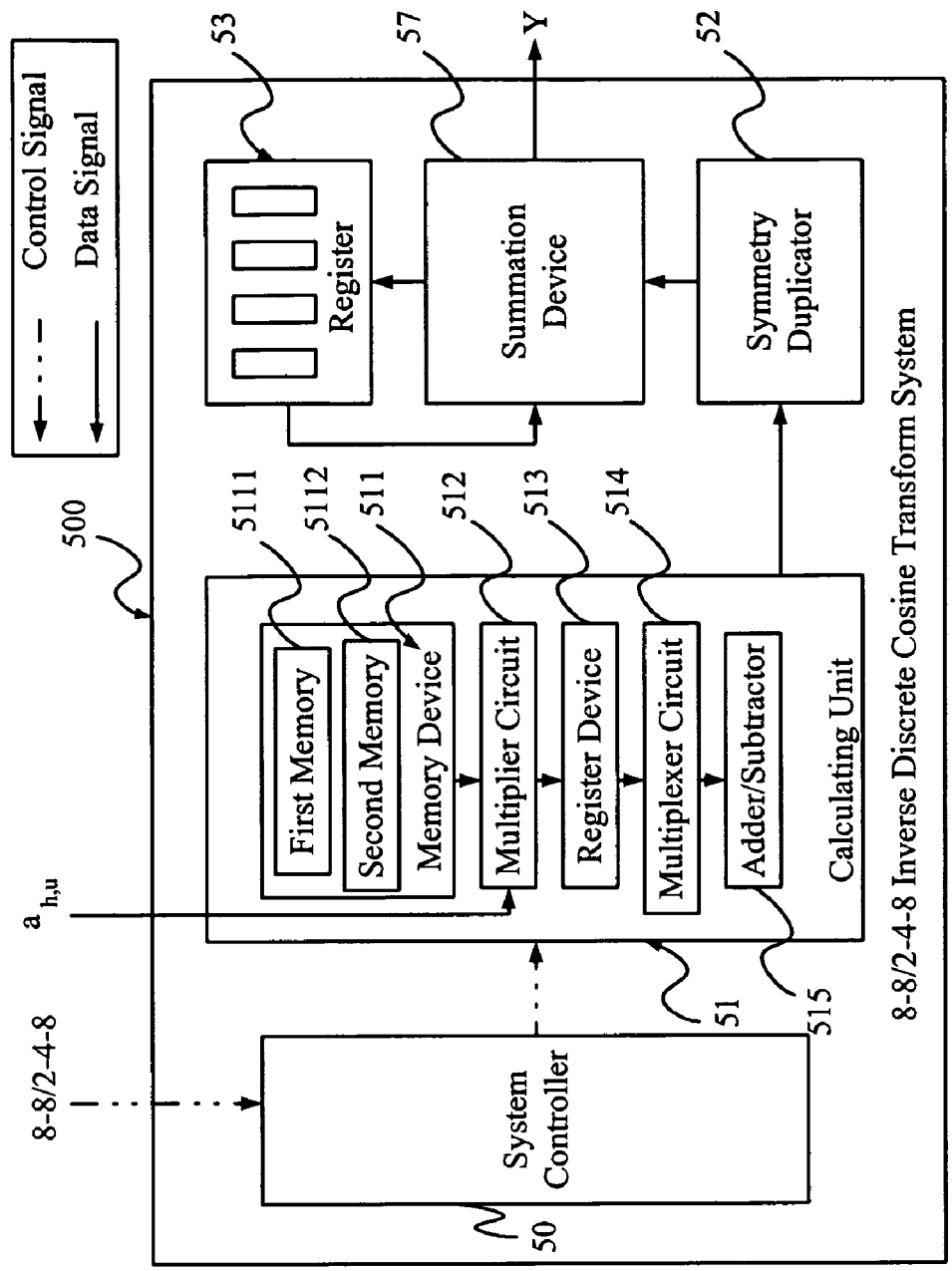

FIG. 5 is a functional block diagram of the data processing system of the 8-8/2-4-8 IDCT of the present invention.

Figure 6:
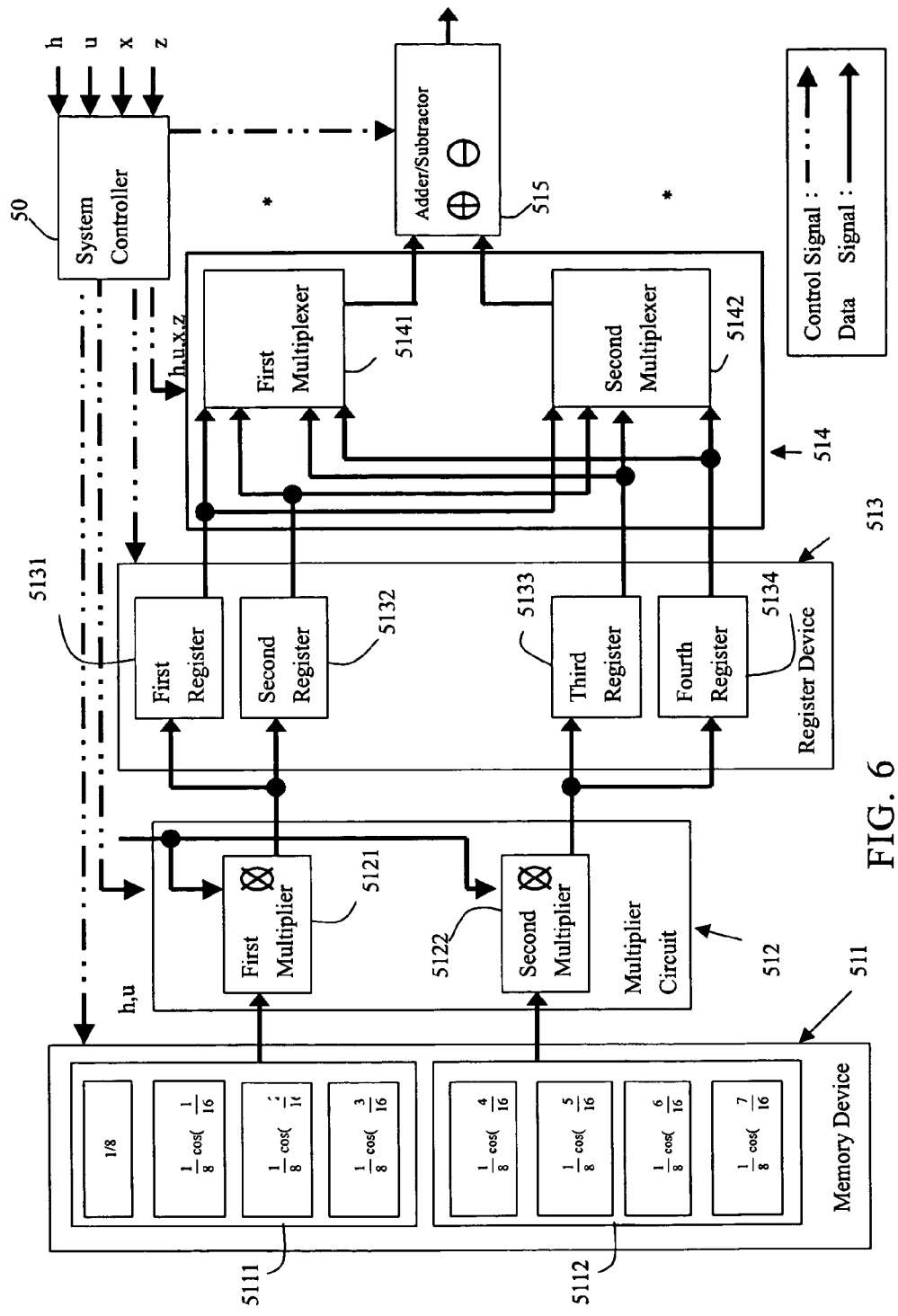

FIG. 6 is a block diagram of the data calculations and functions of the calculating unit shown in FIG. 5.

DETAILED DESCRIPTION OF THE INVENTION

The present invention provides an inverse discrete cosine transform (IDCT) system, which has high speed calculation and low cost of production, for transforming an input matrix (A) through a $2^N$-$2^N/2$-$2^{N-1}$-$2^N$ IDCT procedure to obtain a corresponding output matrix (Y). Wherein N is a natural number, it is usually equal to 3.

Figure 1:
FIG. 1 is a schematic diagram of the inverse discrete cosine transform (IDCT) procedure.
Figure 2:
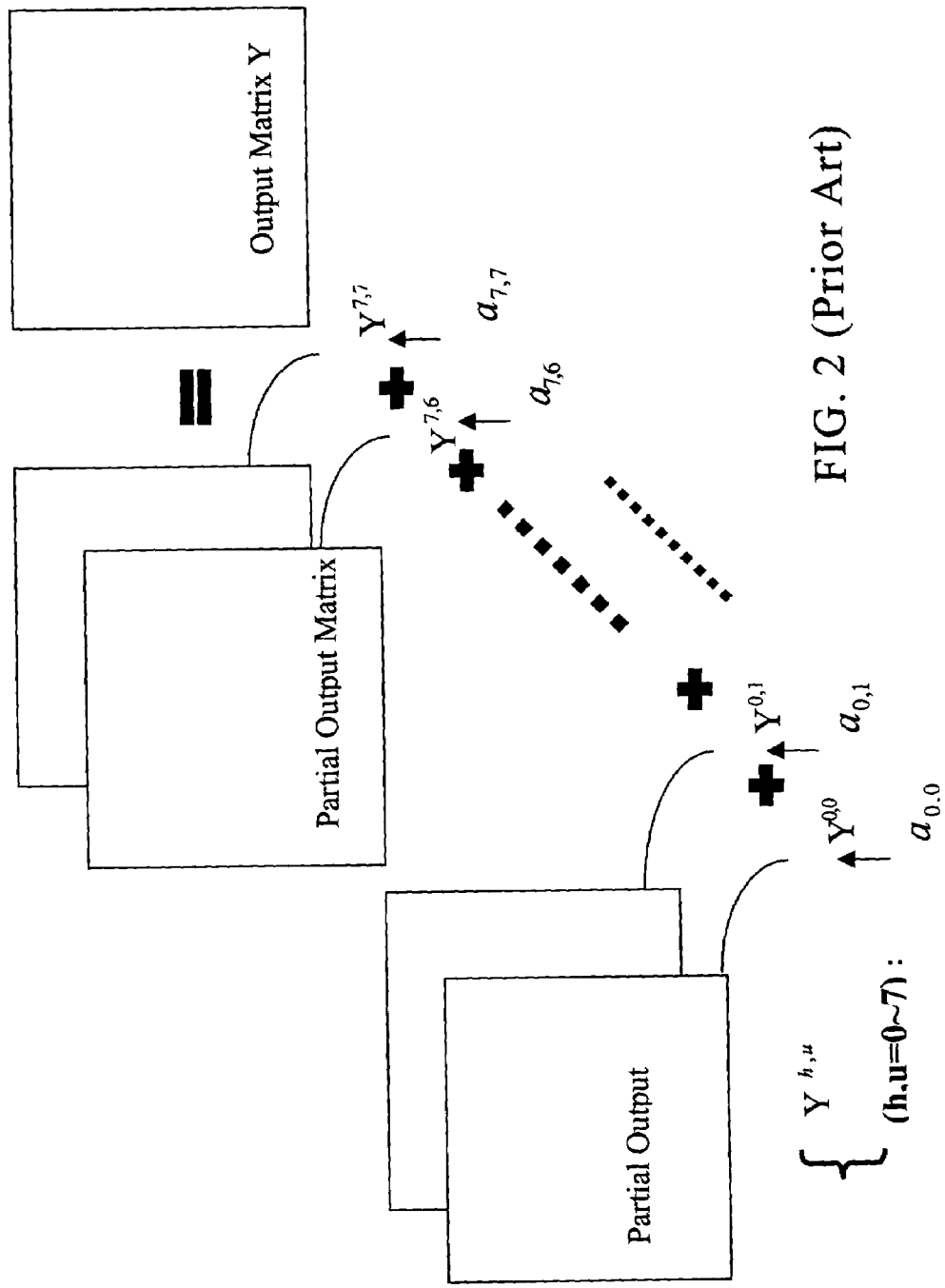
FIG. 2 is a schematic diagram which is about prior arts cumulatively summing up the partial output matrixes ($Y^{h,u}$) to obtain the output matrix (Y).
Figure 3:
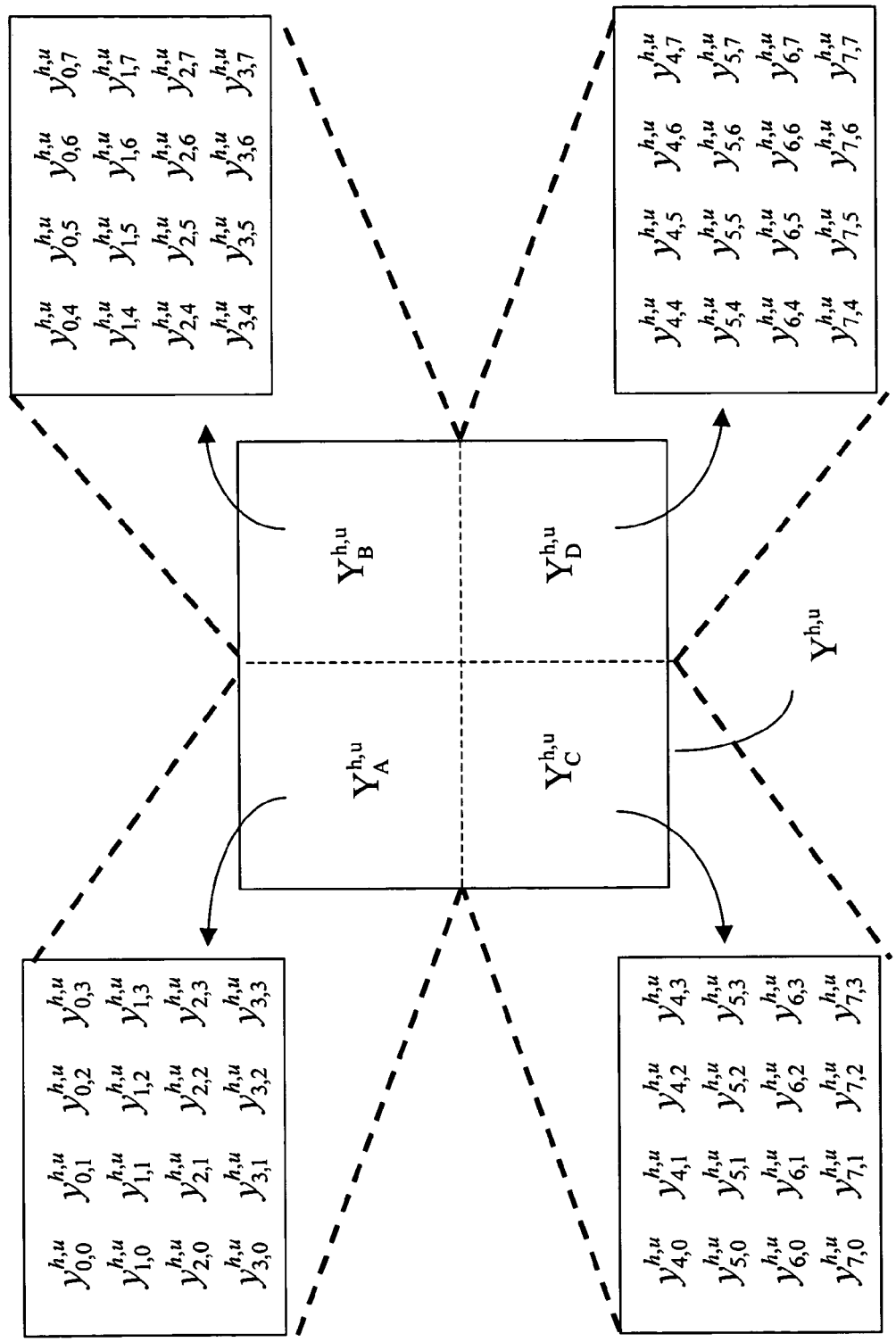
FIG. 3 is a schematic diagram of the four partial sub-output matrixes ($Y_A^{h,u}$, $Y_B^{h,u}$, $Y_C^{h,u}$, and $Y_D^{h,u}$).

In the following paragraphs, a case with N=3 is taken as an example to explain the method of the present invention by a preferred embodiment. Referring to FIG. 3, FIG. 3 is a schematic diagram of each partial output matrix ($Y^{h,u}$) shown in FIG. 2. In FIG. 3, the same as in FIG. 2, each partial output matrix ($Y^{h,u}$) represents the contributions to the output matrix (Y) after the calculation of the IDCT formulae is performed on an inputted DCT coefficient ($a_{h,u}$, h=0~7, u=0~7). Different partial output matrixes are calculated according to the row index (h) and the column index (u) of the DCT coefficient ($a_{h,u}$).

The relation between each DCT coefficient and each partial output matrix ($Y^{h,u}$) can be expressed as $Y^{h,u}=C_A^{h,u} \times a_{h,u}$, wherein $C_A^{h,u}$ is a transform matrix of eight rows by eight columns. According to the IDCT formulae, each DCT coefficient ($a_{h,u}$) and each element $$(y_{x,z}^{h,u})$$

of the partial output matrix must satisfy the following formulae:

$$y_{x,z}^{h,u} = C_{x,z}^{h,u} \times a_{h,u}.$$

For the 8-8 IDCT procedure, the formulae is as follow:

$$C_{x,z}^{h,u} = c(h)c(u) * \cos\left(\frac{(2x+1)}{16}h\pi\right) * \cos\left(\frac{(2z+1)}{16}u\pi\right),$$

wherein u, z, h, and x range from 0 to 7.

For the 2-4-8 IDCT procedure, the formulae is as follow:

$$C_{x,z}^{h,u} = (-1)^j c(h)c(u) * \cos\left(\frac{(2x+1)}{16}h\pi\right) * \cos\left(\frac{(2g+1)}{8}u\pi\right)$$

wherein u, z, h, and x range from 0 to 7, and when z is an odd number and u=4, 5, 6, 7, then j=1; otherwise, j=0. When z is an odd number, then z=2g+1; when z is an even number, then z=2g.

As shown in FIG. 3, the present invention further takes each partial output matrix ($Y^{h,u}$) as a matrix that comprises a plurality of partial sub-output matrixes. In the preferred embodiment of the present invention, each partial output matrix ($Y^{h,u}$) is divided into four partial sub-output matrixes ($Y_A^{h,u}$, $Y_B^{h,u}$, $Y_C^{h,u}$, and $Y_D^{h,u}$). The matrix size of each partial sub-output matrix is the same. In other words, each partial sub-output matrix comprises 16 matrix elements of the original partial output matrix ($Y^{h,u}$). Each matrix element of the partial output matrix ($Y^{h,u}$) is called as a partial output data.

The corresponding four partial sub-output matrixes ($Y_A^{h,u}$, $Y_B^{h,u}$, $Y_C^{h,u}$, and $Y_D^{h,u}$) of different partial output matrix ($Y^{h,u}$) are different from other partial output matrixes. In other words, each partial output matrix ($Y^{h,u}$) and its four partial sub-output matrixes ($Y_A^{h,u}$, $Y_B^{h,u}$, $Y_C^{h,u}$, and $Y_D^{h,u}$) are functions of row index (h) and column index (u). The partial output matrix ($Y^{h,u}$) and the partial sub-output matrixes ($Y_A^{h,u}$, $Y_B^{h,u}$, $Y_C^{h,u}$, and $Y_D^{h,u}$) can be expressed as follow:

$$Y^{h,u} = \begin{bmatrix} Y_A^{h,u} & Y_B^{h,u} \\ Y_C^{h,u} & Y_D^{h,u} \end{bmatrix}, \text{ wherein}$$

$$Y_A^{h,u} = \begin{bmatrix} y_{0,0}^{h,u} & y_{0,1}^{h,u} & y_{0,2}^{h,u} & y_{0,3}^{h,u} \\ y_{1,0}^{h,u} & y_{1,1}^{h,u} & y_{1,2}^{h,u} & y_{1,3}^{h,u} \\ y_{2,0}^{h,u} & y_{2,1}^{h,u} & y_{2,2}^{h,u} & y_{2,3}^{h,u} \\ y_{3,0}^{h,u} & y_{3,1}^{h,u} & y_{3,2}^{h,u} & y_{3,3}^{h,u} \end{bmatrix}$$

$$Y_B^{h,u} = \begin{bmatrix} y_{0,4}^{h,u} & y_{0,5}^{h,u} & y_{0,6}^{h,u} & y_{0,7}^{h,u} \\ y_{1,4}^{h,u} & y_{1,5}^{h,u} & y_{1,6}^{h,u} & y_{1,7}^{h,u} \\ y_{2,4}^{h,u} & y_{2,5}^{h,u} & y_{2,6}^{h,u} & y_{2,7}^{h,u} \\ y_{3,4}^{h,u} & y_{3,5}^{h,u} & y_{3,6}^{h,u} & y_{3,7}^{h,u} \end{bmatrix},$$

$$Y_C^{h,u} = \begin{bmatrix} y_{4,0}^{h,u} & y_{4,1}^{h,u} & y_{4,2}^{h,u} & y_{4,3}^{h,u} \\ y_{5,0}^{h,u} & y_{5,1}^{h,u} & y_{5,2}^{h,u} & y_{5,3}^{h,u} \\ y_{6,0}^{h,u} & y_{6,1}^{h,u} & y_{6,2}^{h,u} & y_{6,3}^{h,u} \\ y_{7,0}^{h,u} & y_{7,1}^{h,u} & y_{7,2}^{h,u} & y_{7,3}^{h,u} \end{bmatrix}, \text{ and}$$

$$Y_D^{h,u} = \begin{bmatrix} y_{4,4}^{h,u} & y_{4,5}^{h,u} & y_{4,6}^{h,u} & y_{4,7}^{h,u} \\ y_{5,4}^{h,u} & y_{5,5}^{h,u} & y_{5,6}^{h,u} & y_{5,7}^{h,u} \\ y_{6,4}^{h,u} & y_{6,5}^{h,u} & y_{6,6}^{h,u} & y_{6,7}^{h,u} \\ y_{7,4}^{h,u} & y_{7,5}^{h,u} & y_{7,6}^{h,u} & y_{7,7}^{h,u} \end{bmatrix}.$$

The symmetry relations of the four partial sub-output matrixes ($Y_A^{h,u}$, $Y_B^{h,u}$, $Y_C^{h,u}$, and $Y_D^{h,u}$) are described as follows:

$$Y^{h,u} = \begin{bmatrix} Y_A^{h,u} & Y_B^{h,u} \\ Y_C^{h,u} & Y_D^{h,u} \end{bmatrix}$$

$$= \begin{bmatrix} Y_{A_1}^{h,u} & Y_{A_1'}^{h,u} \\ Y_{A_1''}^{h,u} & Y_{A_1'''}^{h,u} \end{bmatrix}, \quad \begin{array}{l} 8-8IDCT, h=(0,2,4,6), u=(0,2,4,6) \text{ or} \\ 2-4-8 \ IDCT, h=(0,2,4,6), u=(0,2,4,6) \end{array}$$

$$= \begin{bmatrix} Y_{A_2}^{h,u} & -Y_{A_2'}^{h,u} \\ Y_{A_2''}^{h,u} & -Y_{A_2'''}^{h,u} \end{bmatrix}, \quad \begin{array}{l} 8-8IDCT, h=(0,2,4,6), u=(1,3,5,7) \text{ or} \\ 2-4-8IDCT, h=(0,2,4,6), u=(1,3,4,6) \end{array}$$

$$= \begin{bmatrix} Y_{A_3}^{h,u} & Y_{A_3'}^{h,u} \\ -Y_{A_3''}^{h,u} & -Y_{A_3'''}^{h,u} \end{bmatrix}, \quad \begin{array}{l} 8-8IDCT, h=(1,3,5,7), u=(0,2,4,6) \text{ or} \\ 2-4-8IDCT, h=(1,3,5,7), u=(0,2,5,7) \end{array}$$

$$= \begin{bmatrix} Y_{A_4}^{h,u} & -Y_{A_4'}^{h,u} \\ -Y_{A_4''}^{h,u} & Y_{A_4'''}^{h,u} \end{bmatrix}, \quad \begin{array}{l} 8-8IDCT, h=(1,3,5,7), u=(1,3,5,7) \text{ or} \\ 2-4-8IDCT, h=(1,3,5,7), u=(1,3,4,6) \end{array},$$

wherein the definitions of $Y_{A_n}^{h,u}$, $Y_{A_n''}^{h,u}$, and $Y_{A_n'''}^{h,u}$ are described as follow:

$$Y_{A_n'}^{h,u} = \begin{bmatrix} y_{0,3}^{h,u} & y_{0,2}^{h,u} & y_{0,1}^{h,u} & y_{0,0}^{h,u} \\ y_{1,3}^{h,u} & y_{1,2}^{h,u} & y_{1,1}^{h,u} & y_{1,0}^{h,u} \\ y_{2,3}^{h,u} & y_{2,2}^{h,u} & y_{2,1}^{h,u} & y_{2,0}^{h,u} \\ y_{3,3}^{h,u} & y_{3,2}^{h,u} & y_{3,1}^{h,u} & y_{3,0}^{h,u} \end{bmatrix},$$

-continued $$Y_{A_n''}^{h,u} = \begin{bmatrix} y_{3,0}^{h,u} & y_{3,1}^{h,u} & y_{3,2}^{h,u} & y_{3,3}^{h,u} \\ y_{2,0}^{h,u} & y_{2,1}^{h,u} & y_{2,2}^{h,u} & y_{2,3}^{h,u} \\ y_{1,0}^{h,u} & y_{1,1}^{h,u} & y_{1,2}^{h,u} & y_{1,3}^{h,u} \\ y_{0,0}^{h,u} & y_{0,1}^{h,u} & y_{0,2}^{h,u} & y_{0,3}^{h,u} \end{bmatrix}, \text{ and}$$

$$Y_{A_n'''}^{h,u} = \begin{bmatrix} y_{3,3}^{h,u} & y_{3,2}^{h,u} & y_{3,1}^{h,u} & y_{3,0}^{h,u} \\ y_{2,3}^{h,u} & y_{2,2}^{h,u} & y_{2,1}^{h,u} & y_{2,0}^{h,u} \\ y_{1,3}^{h,u} & y_{1,2}^{h,u} & y_{1,1}^{h,u} & y_{1,0}^{h,u} \\ y_{0,3}^{h,u} & y_{0,2}^{h,u} & y_{0,1}^{h,u} & y_{0,0}^{h,u} \end{bmatrix}.$$

In further observation, in the above-mentioned symmetry relation functions of either the 8-8 IDCT or 2-4-8 IDCT calculation, there are only four kinds of different symmetry relations among the four partial sub-output matrixes ($Y_A^{h,u}$, $Y_B^{h,u}$, $Y_C^{h,u}$, and $Y_D^{h,u}$). Therefore, the calculating procedures of the output matrix (Y) of the present invention are described as follows: first, classifying the inputted DCT coefficients ($a_{h,u}$) according to the symmetry relations, wherein $a_{h,u}$ is 8-8 DCT or 2-4-8 DCT coefficient; next, cumulatively and respectively summing up the corresponding partial sub-output matrixes ($Y_A^{h,u}$) of the same symmetry relation ($Y_{A_1}^{h,u}$, $Y_{A_2}^{h,u}$, $Y_{A_3}^{h,u}$, and $Y_{A_4}^{h,u}$); after finishing the previous step, four matrixes ($Y_{A_1}$, $Y_{A_2}$, $Y_{A_3}$, and $Y_{A_4}$) are obtained, or they can be called the four summed partial sub-output matrixes; finally, calculating the output matrix (Y) by the following formulae:

$$Y = \begin{bmatrix} Y_A & Y_B \\ Y_C & Y_D \end{bmatrix}, \text{ wherein}$$

$$\begin{bmatrix} Y_A \\ Y_B \\ Y_C \\ Y_D \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} Y_{A_1} \\ Y_{A_2} \\ Y_{A_3} \\ Y_{A_4} \end{bmatrix}$$

Therefore, in the embodiment of the present invention, when a DCT coefficient ($a_{h,u}$) is inputted, the corresponding partial sub-output matrix ($Y_A^{h,u}$) is first calculated, then the symmetry relation of the partial sub-output matrix is determined according to the row index (h) and column index (u), and then the new-generated partial sub-output matrix ($Y_A^{h,u}$) is cumulatively summed up with one of the four summed partial sub-output matrixes ($Y_{A_1}$, $Y_{A_2}$, $Y_{A_3}$, and $Y_{A_4}$). Until all the DCT coefficients ($a_{h,u}$) are inputted, and the four summed partial sub-output matrixes ($Y_{A_1}$, $Y_{A_2}$, $Y_{A_3}$, and $Y_{A_4}$) have already cumulatively summed up, that the output matrix (Y) is then finally calculated by using the above-mentioned formulae between the output matrix (Y) and the four summed partial sub-output matrixes.

Because the present invention only sums up one partial sub-output matrix at each time, only 16 summation devices are needed to calculate 16 summation operations. Therefore, only a total of 1024 summation operations are performed after cumulatively summing up the four summed partial sub-output matrixes. Another 192 summation operations are needed to sequentially sum up the four summed partial sub-output matrixes by the 16 summation devices to obtain the output matrix (Y); therefore, a total of 1216 summation operations are needed to be performed. Comparing to the prior art shown in FIG. 2, the number of summation devices and the summations are substantially decreased to quarter of the original number; therefore, the present invention can effectively decrease the cost of the system hardware and the power consumption.

The method of how to calculate $Y_A^{h,u}$ is described as follows. $Y_A^{h,u}$ comprises 16 matrix elements of the left-top corner of the partial output matrix ($Y^{h,u}$) and can be expressed as follows:

$$Y_A^{h,u} = \begin{bmatrix} y_{0,0}^{h,u} & y_{0,1}^{h,u} & y_{0,2}^{h,u} & y_{0,3}^{h,u} \\ y_{1,0}^{h,u} & y_{1,1}^{h,u} & y_{1,2}^{h,u} & y_{1,3}^{h,u} \\ y_{2,0}^{h,u} & y_{2,1}^{h,u} & y_{2,2}^{h,u} & y_{2,3}^{h,u} \\ y_{3,0}^{h,u} & y_{3,1}^{h,u} & y_{3,2}^{h,u} & y_{3,3}^{h,u} \end{bmatrix},$$

Because of the symmetry characteristic of the cosine function, under different combinations of the row index (h) and the column index (u) of the present inputted IDCT coefficient ($a_{h,u}$), $Y_A^{h,u}$ itself may have different symmetry characteristics; $Y_A^{h,u}$ can further be simplified according to the principle of the symmetry characteristics, so as to reduce the number of times of calculation during the IDCT procedure. Furthermore, besides the row index (h) and the column index (u), the practical symmetry and simplified rules are also related to the case of whether the present inputted DCT coefficient ($a_{h,u}$) is 2-4-8 or 8-8 DCT coefficient. In the following paragraphs, the symmetry and simplified rules, suitable for 2-4-8 IDCT and 8-8 IDCT, are described respectively.

As to the 2-4-8 IDCT, in order to further reduce the number of calculation during the IDCT procedure, the partial sub-output matrix ($Y_A^{h,u}$) can be further simplified. First, according to the trigonometric function in mathematics, the product of two cosine functions can also be equivalently expressed in the sum of two other cosine functions. That means, $$C_{x,z}^{h,u},$$

the product of two cosine functions, can be equivalently expressed in the following as $$C_{+x,z}^{h,u} + C_{-x,z}^{h,u},$$

the sum of two cosine functions.

$$\begin{aligned} C_{x,z}^{h,u} &= (-1)^j c(h) c(u) * \cos\left(\frac{(2x+1)}{16} h\pi\right) * \cos\left(\frac{(2g+1)}{8} u\pi\right) \\ &= \frac{(-1)^j c(h) c(u)}{2} \left\{ \cos\left[\frac{((2x+1)h + (2g+1)2u)\pi}{16}\right] + \cos\left[\frac{((2x+1)h - (2g+1)2u)\pi}{16}\right] \right\} \\ &= C_{+x,z}^{h,u} + C_{-x,z}^{h,u}. \end{aligned}$$

The definitions of $$C_{+x,z}^{h,u} \text{ and } C_{-x,z}^{h,u}$$

are as follows:

$$C_{+x,z}^{h,u} = \frac{(-1)^j c(h)c(u)}{2}\left\{\cos\left[\frac{((2x+1)h+(2g+1)2u)\pi}{16}\right]\right\},$$

$$C_{-x,z}^{h,u} = \frac{(-1)^j c(h)c(u)}{2}\left\{\cos\left[\frac{((2x+1)h-(2g+1)2u)\pi}{16}\right]\right\},$$

and u, z, h, x=0~7. When z is an odd number, and u=4, 5, 6, 7, then j=1; otherwise, j=0. When z is an odd number, z=2g+1; when z is an even number, z=2g.

Therefore, the calculation of the partial sub-output matrix ($Y_A^{h,u}$) can be obtained through these steps: first, calculating two 4×4 matrixes $$(C_{+x,z}^{h,u} \text{ and } C_{-x,z}^{h,u}),$$

wherein z, x=0~3, and then, summing up the two matrixes.

Figure 4:
FIG. 4 is a schematic diagram of the whole symmetry characteristics of $$C_{+x,z}^{h,u} \text{ and } C_{-x,z}^{h,u}$$

FIG. 4 is a schematic diagram of the whole symmetry characteristics of $$C_{+x,z}^{h,u} \text{ and } C_{-x,z}^{h,u}$$

which are suitable for 2-4-8 IDCT. According to the symmetry characteristics of the cosine function, $$C_{+x,z}^{h,u} \text{ and } C_{-x,z}^{h,u}$$

have the symmetry characteristics shown in FIG. 4; the symmetry characteristic is defined as 2-4-8 double horizontal symmetry according to the present invention. According to this symmetry characteristic, when $$C_{+x,z}^{h,u} \text{ and } C_{-x,z}^{h,u}$$

are calculated, only the 8 matrix elements, in which the row index is equal to 0, 1, 2, 3 and the column index is equal to 0, 2, are needed to be calculated; the rest of the 8 matrix elements can be generated by duplication according to this symmetry characteristic.

Similarly, when the 8-8 IDCT procedure is performed, the partial sub-output matrix ($Y_A^{h,u}$) can also be further simplified. According to the trigonometric function in mathematics, $$C_{x,z}^{h,u}$$

can be reduced to the following types; the detail is as follows:

$$C_{x,z}^{h,u} = c(h)c(u) * \cos\left(\frac{(2x+1)}{16}h\pi\right) * \cos\left(\frac{(2z+1)}{16}u\pi\right)$$

-continued $$= \frac{c(h)c(u)}{2}\left\{\cos\left[\frac{((2x+1)h+(2z+1)u)\pi}{16}\right] + \cos\left[\frac{((2x+1)h-(2z+1)u)\pi}{16}\right]\right\}$$

$$= C_{+x,z}^{h,u} + C_{-x,z}^{h,u}$$

Wherein $$C_{+x,z}^{h,u} = \frac{c(h)c(u)}{2}\left\{\cos\left[\frac{((2x+1)h+(2z+1)u)\pi}{16}\right]\right\},$$

$$C_{-x,z}^{h,u} = \frac{c(h)c(u)}{2}\left\{\cos\left[\frac{((2x+1)h-(2z+1)u)\pi}{16}\right]\right\},$$

and u, z, h, x=0~7.

Therefore, the calculation of the partial sub-output matrix ($Y_A^{h,u}$) can be obtained through these steps: first, calculating two 4×4 matrixes $$(C_{+x,z}^{h,u} \text{ and } C_{-x,z}^{h,u}),$$

wherein z, x=0~3, and then, summing up the two matrixes.

According to the symmetry characteristic of the cosine function, $C_{+x,z}^{h,u}$ and $C_{-x,z}^{h,u}$ have the following symmetry characteristics:

Type 1 is defined as 8-8 central symmetry type 1, and it occurs when h=1, 3, 5, or 7, and u=1, 3, 5, or 7. Assuming X=3−x, and Z=3−z, $$C_{+X,Z}^{h,u} = (-1)^{(h+u)/2} C_{+x,z}^{h,u}$$

$$C_{-X,Z}^{h,u} = (-1)^{(h-u)/2} C_{-x,z}^{h,u}$$

According to this symmetry type, only the 8 matrix elements, in which the row index (x) is equal to 0, 1, 2, 3 and the column index (z) is equal to 0, 1, of the 4×4 matrixes $$(C_{+x,z}^{h,u} \text{ and } C_{-x,z}^{h,u}, z, x = 0 \sim 3)$$

need to be calculated; the rest of the 8 matrix elements can be generated by duplication according to this symmetry characteristic.

Type 2 is defined as 8-8 central symmetry type 2, and it occurs when h=0, 2, 4, or 6, and u=0, 2, 4, or 6. Assuming X=3−x, and Z=3−z, $$C_{+X,Z}^{h,u} = (-1)^{(h+u)/2} C_{+x,z}^{h,u}$$

$$C_{-X,Z}^{h,u} = (-1)^{(h+u)/2} C_{-x,z}^{h,u}$$

According to this symmetry type, only the 8 matrix elements, in which the row index (x) is equal to 0, 1, 2, 3 and the column index (z) is equal to 0, 1, of the 4×4 matrixes $$(C_{+x,z}^{h,u} \text{ and } C_{-x,z}^{h,u}, z, x = 0 \sim 3)$$

need to be calculated; the rest of the 8 matrix elements can be generated by duplication according to this symmetry characteristic.

Type 3 is defined as 8-8 vertical symmetry, and it occurs when h=0, 2, 4, or 6, and u=1, 3, 5, or 7.

Assuming X=3-x, $$C_{+X,z}^{h,u} = (-1)^{h/2} C_{+x,z}^{h,u}$$
$$C_{-X,z}^{h,u} = (-1)^{h/2} C_{-x,z}^{h,u}$$

According to this symmetry type, only the 8 matrix elements, in which the row index (x) is equal to 0, 1 and the column index (z) is equal to 0, 1, 2, 3, of the 4×4 matrixes $$(C_{+x,z}^{h,u} \text{ and } C_{-x,z}^{h,u}, z, x = 0 \sim 3)$$

need to be calculated; the rest of the 8 matrix elements can be generated by duplication according to this symmetry characteristic.

Type 4 is defined as 8-8 horizontal symmetry, and it occurs when h=1, 3, 5, or 7, and u=0, 2, 4, or 6.

Assuming Z=3-z, $$C_{+x,Z}^{h,u} = (-1)^{u/2} C_{+x,z}^{h,u}$$
$$C_{-x,Z}^{h,u} = (-1)^{u/2} C_{-x,z}^{h,u}$$

According to this symmetry type, only the 8 matrix elements, in which the row index (x) is equal to 0, 1, 2, 3 and the column index (z) is equal to 0, 1, of the 4×4 matrixes $$(C_{+x,z}^{h,u} \text{ and } C_{-x,z}^{h,u}, z, x = 0 \sim 3)$$

need to be calculated; the rest of the 8 matrix elements can be generated by duplication according to this symmetry characteristic.

Besides, the above-mentioned symmetry characteristics of the total 64 kinds of the row index (h) and the column index (u) combinations of the IDCT coefficient ($a_{h,u}$), there are 16 kind of (h, u) combinations belonging to type 1, 16 kind of (h, u) combinations belonging to type 2, 16 kind of (h, u) combinations belonging to type 3, and 16 kind of (h, u) combinations belonging to type 4. That means no matter the partial sub-output matrix ($Y_A^{h,u}$) belongs to which of the 64 partial output matrix ($Y^{h,u}$), the partial sub-output matrix ($Y_A^{h,u}$) can be calculated by the above-mentioned symmetry characteristics.

The method of how to calculate the 8 matrix elements of the 4×4 matrixes $$(C_{+x,z}^{h,u} \text{ and } C_{-x,z}^{h,u}, z, x = 0 \sim 3)$$

is described in the following paragraphs. In principle, if any one matrix element of $$C_{+x,z}^{h,u} \text{ and } C_{-x,z}^{h,u}$$

can be calculated, then through eight times of similar calculations, the 8 matrix elements of $$C_{+x,z}^{h,u} \text{ and } C_{-x,z}^{h,u} \ (z, x = 0 \sim 3)$$

with specific row index (h) and column index (u) can be calculated. At the same time, the rest of the 8 matrix elements are duplicated according to the symmetry characteristics; then, the partial sub-output matrix ($Y_A^{h,u}$) can be calculated. Therefore, in the following descriptions, the key point focuses on how to calculate one matrix element $$(y_{x,z}^{h,u})$$

of a partial sub-output matrix ($Y_A^{h,u}$).

Assume the 8-8 IDCT procedure is performed as follows.

$$C_{x,z}^{h,u} = C_{+x,z}^{h,u} + C_{-x,z}^{h,u} = \frac{c(h)c(u)}{2}$$
$$\left\{ \cos\left[\frac{((2x+1)h + (2z+1)u)\pi}{16}\right] + \cos\left[\frac{((2x+1)h - (2z+1)u)\pi}{16}\right] \right\},$$

and u, z, h, x=0~7.

To define $W_b^a$ as an integer:

$$W_b^a = \begin{cases} (2b+1)a, & a \neq 0 \\ 4, & a = 0 \end{cases}$$

therefore, $$C_{x,z}^{h,u} = C_{+x,z}^{h,u} + C_{-x,z}^{h,u}$$
$$= \frac{1}{8}\left\{ \cos\left[\frac{(W_x^h + W_z^u)\pi}{16}\right] + \cos\left[\frac{(W_x^h - W_z^u)\pi}{16}\right] \right\}$$
$$= \frac{1}{8}\left\{ \cos\left[\frac{(W_{+xz}^{hu})\pi}{16}\right] + \cos\left[\frac{(W_{-xz}^{hu})\pi}{16}\right] \right\},$$

wherein $W_{+xz}^{hu} = W_x^h + W_z^u$, $W_{-xz}^{hu} = W_x^h - W_z^u$

Observing the above formulae, because the addition and subtraction of any two integers must be same odd or even numbers, and because of the periodicity of the cosine function, therefore, $C_{+x,z}^{h,u}$ and $C_{-x,z}^{h,u}$ must both be selected from $$\frac{1}{8}\left\{\cos\left(\frac{\pi}{16}\right), \cos\left(\frac{3\pi}{16}\right), \cos\left(\frac{5\pi}{16}\right), \cos\left(\frac{7\pi}{16}\right)\right\},$$

or both be selected from $$\frac{1}{8}\left\{\cos\left(\frac{0\pi}{16}\right), \cos\left(\frac{2\pi}{16}\right)\cos\left(\frac{4\pi}{16}\right), \cos\left(\frac{6\pi}{16}\right), \cos\left(\frac{8\pi}{16}\right)\right\} =$$
$$\frac{1}{8}\left\{1, \cos\left(\frac{2\pi}{16}\right)\cos\left(\frac{4\pi}{16}\right), \cos\left(\frac{6\pi}{16}\right), 0\right\}.$$

Assume the 2-4-8 IDCT procedure is performed as follows.

$$C_{x,z}^{h,u} = C_{+x,z}^{h,u} + C_{-x,z}^{h,u} = \frac{(-1)^j c(h)c(u)}{2}$$
$$\left\{\cos\left[\frac{((2x+1)h + (2g+1)2u)\pi}{16}\right] + \cos\left[\frac{((2x+1)h - (2g+1)2u)\pi}{16}\right]\right\}$$

and u, z, h, x=0~7. When z is an odd number, and u=4, 5, 6, 7, then j=1; otherwise, j=0. When z is an odd number, z=2g+1; when z is an even number, z=2g.

To define $M_b^a$ and $W_b^a$ as integers:

$$M_b^a = \begin{cases} (2b+1)a, & a \neq 0 \\ 2, & a = 0, \end{cases}$$

$$W_b^a = \begin{cases} (2b+1)a, & a \neq 0 \\ 4, & a = 0, \end{cases}$$

therefore, $$C_{x,z}^{h,u} = C_{+x,z}^{h,u} + C_{-x,z}^{h,u} =$$
$$\frac{(-1)^j}{8}\left\{\cos\left[\frac{(W_x^h + 2M_g^u)\pi}{16}\right] + \cos\left[\frac{(W_x^h - 2M_g^u)\pi}{16}\right]\right\} =$$
$$\frac{(-1)^j}{8}\left\{\cos\left[\frac{(WM_{+xg}^{hu})\pi}{16}\right] + \cos\left[\frac{(WM_{-xg}^{hu})\pi}{16}\right]\right\},$$

wherein $WM_{+xg}^{hu} = W_x^h + 2M_g^u$, $WM_{-xg}^{hu} = W_x^h - 2M_g^u$.

According to the above formulae, when h is an odd number, $WM_{+xg}^{hu}$ and $WM_{-xg}^{hu}$ must be odd numbers, and because of the periodicity of the cosine function, $C_{+x,z}^{h,u}$ and $C_{-x,z}^{h,u}$ must be one of the four, selected from $$\frac{(-1)^j}{8}\left\{\cos\left(\frac{\pi}{16}\right), \cos\left(\frac{3\pi}{16}\right), \cos\left(\frac{5\pi}{16}\right), \cos\left(\frac{7\pi}{16}\right)\right\}.$$

On the other hand, when h is an even number, $WM_{+xg}^{hu}$ and $WM_{-xg}^{hu}$ must both be even number; because the addition and subtraction of any two integers must be same odd or even numbers, and because of the periodicity of the cosine function, $C_{+x,z}^{h,u}$ and $C_{-x,z}^{h,u}$ must be both selected from $$\frac{(-1)^j}{8}\left\{\cos\left(\frac{0\pi}{16}\right), \cos\left(\frac{4\pi}{16}\right), \cos\left(\frac{8\pi}{16}\right)\right\} = \frac{(-1)^j}{8}\left\{1, \cos\left(\frac{4\pi}{16}\right), 0\right\},$$

or from $$\frac{(-1)^j}{8}\left\{\cos\left(\frac{2\pi}{16}\right), \cos\left(\frac{6\pi}{16}\right)\right\}.$$

Therefore, whether the 8-8 IDCT or 2-4-8 IDCT procedure is performed, the present invention can calculate any matrix element of $C_{+x,z}^{h,u}$ and $C_{-x,z}^{h,u}$ by dividing and storing the transform coefficients into two memories according to the above-mentioned rules. After calculating the product of the inputted DCT coefficient ($a_{h,u}$) and the two selected transforming coefficients from the two memories, respectively, the two product values are then added or subtracted, and finally one matrix element $(y_{x,z}^{h,u})$ of the partial sub-output matrix ($Y_A^{h,u}$) can be obtained, so as to simplify the calculations and shorten the calculating time.

The following paragraphs introduce the functional block diagram of the data processing system of 8-8/2-4-8 IDCT according to the present invention.

Referring to FIG. 5, FIG. 5 is a functional block diagram of the data processing system of the 8-8/2-4-8 IDCT of the present invention. The objective of the data processing system 500 is to transform an input matrix (A) with 8 rows and 8 columns of DCT coefficients ($a_{h,u}$), depending on whether $a_{h,u}$ is 8-8 IDCT or 2-4-8 IDCT to perform the corresponding 8-8 IDCT or 2-4-8 IDCT procedure, so as to obtain an output matrix (Y) that comprises 8×8 output data. In order to reach the objective, the data processing system 500 of IDCT comprises: a system controller 50, a calculating unit 51, a symmetry duplicator 52, a summation device 57, and four summed partial sub-output matrix register 53. The system controller 50 is used for providing a required set of control signals to the system 500 for data processing according to the row index (h) and the column index (u) of the selected DCT coefficient ($a_{h,u}$), and also according to the row index (x) and the column index (z) of an output data $$(y_{x,z}^{h,u})$$

that is to be generated.

The calculating unit 51 is used for calculating, based on the set of control signals, the selected DCT coefficients through the IDCT procedure, so as to obtain the partial output data $$(y_{x,z}^{h,u})$$

of the corresponding partial sub-output matrix ($Y_A^{h,u}$). The calculating unit 51 comprises: a memory device 511, a multiplier circuit 512, a register device 513, a multiplexer circuit 514, and an adder/subtractor 515. The memory device 511 is used for storing the predetermined set of transform coefficients, and it can output the corresponding transform coefficients according to the set of control signals, wherein the memory device 511 comprises a first memory 5111 and a second memory 5112 for storing the transform coefficients. The multiplier circuit 512 is used for multiplying the transform coefficients, outputted from the memory device 511, together with the selected DCT coefficients and obtaining a plurality of products. The register device 513 is used for temporarily storing the products from the multiplier circuit 512. The multiplexer circuit 514 is used for selecting a product from the register device 513 and later obtaining the partial output data. The adder/subtractor 515 is used for performing the summation or subtraction to the output from the multiplexer circuit 514.

According to the control signals of the system controller, and basing on the matrix element $$(y_{x,z}^{h,u})$$

and two products $$(a_{h,u} * C_{+x,z}^{h,u} \text{ and } a_{h,u} * C_{-x,z}^{h,u})$$

of the partial sub-output matrix calculated by the calculating unit 51, the symmetry duplicator 52 calculates another one matrix element $$(y_{x',z'}^{h,u}),$$

which is symmetrical to $$y_{x,z}^{h,u}$$

in $Y_A^{h,u}$ according to the symmetry relations. Wherein the system controller 50 determines the symmetry types of all the partial output data of the partial sub-output matrix ($Y_A^{h,u}$) according to the row index (h) and the column index (u) of the present selected DCT coefficient, it then controls the symmetry duplicator 52 to calculate a matrix element $$(y_{x',z'}^{h,u}),$$

which is symmetrical to $$y_{x,z}^{h,u}$$

in the partial sub-output matrix ($Y_A^{h,u}$). Therefore, after the calculating unit 51 calculates for eight times, the eight partial output data of the partial sub-output matrix ($Y_A^{h,u}$), which is predetermined to be calculated, are obtained. The symmetry duplicator 52 also symmetrically duplicates the rest of the eight corresponding partial output data, so as to obtain the completed partial sub-output matrix ($Y_A^{h,u}$).

The summation device 57 is used for performing summation on the two matrix elements $$(y_{x,z}^{h,u})$$

of the partial sub-output matrix ($Y_A^{h,u}$), which calculated by the calculating unit and the symmetry duplicator respectively, and the corresponding data of the summed partial sub-output matrix. The four summed partial sub-output matrix register 53 respectively stores the data of the four summed partial sub-output matrixes ($Y_{A1}$, $Y_{A2}$, $Y_{A3}$, and $Y_{A4}$) temporarily. The system controller determines the symmetry relations of the partial sub-output matrixes according to the row index (h) and the column index (u) of the present selected DCT coefficients, and it sums up the new generated data of the partial sub-output matrix ($Y_A^{h,u}$) with one of the four summed partial sub-output matrixes ($Y_{A1}$, $Y_{A2}$, $Y_{A3}$, and $Y_{A4}$) until all the data of the four summed partial sub-output matrixes ($Y_{A1}$, $Y_{A2}$, $Y_{A3}$, and $Y_{A4}$) are completely obtained.

Until all the DCT coefficients ($a_{h,u}$) have been inputted, and after the four summed partial sub-output matrixes ($Y_{A1}$, $Y_{A2}$, $Y_{A3}$, and $Y_{A4}$) have been cumulatively summed up and temporarily stored in the four summed partial sub-output matrix register 53, the summation device 57 calculates the data of the four summed partial sub-output matrixes to obtain the output matrix (Y).

Referring to FIG. 6, FIG. 6 is a block diagram of the data calculations and functions of the calculating unit 51 shown in FIG. 5. The calculating unit 51 is used for calculating the selected DCT coefficients through the IDCT procedure based on the set of control signals, so as to obtain the corresponding partial output data of the partial sub-output matrix ($Y_A^{h,u}$). The calculating unit 51 comprises a memory device 511, a multiplier circuit 512, a register device 513, a multiplexer circuit 514, and an adder/subtractor 515. The memory device 511 is used for storing the predetermined set of transform coefficients and outputting the corresponding transform coefficients according to the set of control signals, wherein the memory device 511 comprises: a first memory for storing the following four values:

$$\frac{1}{8}, \frac{1}{8}\cos\left(\frac{\pi}{16}\right), \frac{1}{8}\cos\left(\frac{2\pi}{16}\right), \frac{1}{8}\cos\left(\frac{3\pi}{16}\right);$$

a second memory is used for storing the following four values:

$$\frac{1}{8}\cos\left(\frac{4\pi}{16}\right), \frac{1}{8}\cos\left(\frac{5\pi}{16}\right), \frac{1}{8}\cos\left(\frac{6\pi}{16}\right), \frac{1}{8}\cos\left(\frac{7\pi}{16}\right).$$

The multiplier circuit 512 comprises a first multiplier 5121 and a second multiplier 5122, and the register device 513 comprises a first register 5131, a second register 5132, a third register 5133, and a fourth register 5134. The first register 5131 and the second register 5132 are connected to the first multiplier 5121 for temporarily storing the product calculated by the first multiplier 5121. The third register 5133 and the fourth register 5134 are connected to the second multiplier 5122 for temporarily storing the product calculated by the second multiplier 5122.

The multiplexer circuit 514 is used for selecting the product from the register device 513, so as to obtain the partial output data later. The multiplexer circuit 514 comprises a first multiplexer 5141 and a second multiplexer 5142; the first multiplexer 5141 and the second multiplexer 5142 respectively select one value from the constant 0 and the four registers, and the values are added or subtracted by the adder/subtractor 515, so as to obtain the partial output data.

When the 8-8 IDCT procedure is being performed, $$C_{+x,z}^{h,u} \text{ and } C_{-x,z}^{h,u}$$

must both be selected from the combination $$\frac{1}{8}\left\{\cos\left(\frac{\pi}{16}\right), \cos\left(\frac{3\pi}{16}\right), \cos\left(\frac{5\pi}{16}\right), \cos\left(\frac{7\pi}{16}\right)\right\},$$

or from the combination $$\frac{1}{8}\left\{1, \cos\left(\frac{2\pi}{16}\right), \cos\left(\frac{4\pi}{16}\right), \cos\left(\frac{6\pi}{16}\right), 0\right\}.$$

When the value is selected from the combination $$\frac{1}{8}\left\{\cos\left(\frac{\pi}{16}\right), \cos\left(\frac{3\pi}{16}\right), \cos\left(\frac{5\pi}{16}\right), \cos\left(\frac{7\pi}{16}\right)\right\},$$

the first multiplier 5121 sequentially multiplies the inputted DCT coefficient with the value $$\frac{1}{8}\cos\left(\frac{\pi}{16}\right)$$

and $$\frac{1}{8}\cos\left(\frac{3\pi}{16}\right)$$

stored in the first memory 5111, and it then respectively stores the two obtained products in the first register 5131 and the second register 5132. At this moment, the second multiplier 5122 sequentially multiplies the inputted DCT coefficient with the value $$\frac{1}{8}\cos\left(\frac{5\pi}{16}\right) \text{ and } \frac{1}{8}\cos\left(\frac{7\pi}{16}\right)$$

stored in the second memory 5112, and it then respectively stores the two obtained products in the third register 5133 and the fourth register 5134.

When the value is selected from the combination $$\frac{1}{8}\left\{1, \cos\left(\frac{2\pi}{16}\right)\cos\left(\frac{4\pi}{16}\right), \cos\left(\frac{6\pi}{16}\right), 0\right\},$$

the first multiplier 5121 sequentially multiplies the inputted DCT coefficient with the value $$\frac{1}{8} \text{ and } \frac{1}{8}\cos\left(\frac{2\pi}{16}\right)$$

stored in the first memory 5111, and it then respectively stores the two obtained products in the first register 5131 and the second register 5132. At this moment, the second multiplier 5122 sequentially multiplies the inputted DCT coefficient with the value $$\frac{1}{8}\cos\left(\frac{4\pi}{16}\right) \text{ and } \frac{1}{8}\cos\left(\frac{6\pi}{16}\right)$$

stored in the second memory 5112, and it then respectively stores the two obtained products in the third register 5133 and the fourth register 5134.

When performing the 2-4-8 IDCT procedure, and when h is an odd number, $$C_{+x,z}^{h,u} \text{ and } C_{-x,z}^{h,u}$$

must both be selected from the combination $$\frac{(-1)^j}{8}\left\{\cos\left(\frac{\pi}{16}\right), \cos\left(\frac{3\pi}{16}\right), \cos\left(\frac{5\pi}{16}\right), \cos\left(\frac{7\pi}{16}\right)\right\}.$$

The first multiplier 5121 sequentially multiplies the inputted DCT coefficient with the value $$\frac{1}{8}\cos\left(\frac{\pi}{16}\right) \text{ and } \frac{1}{8}\cos\left(\frac{3\pi}{16}\right)$$

stored in the first memory 5111, and it then respectively stores the two obtained products in the first register 5131 and the second register 5132. At this moment, the second multiplier 5122 sequentially multiplies the inputted DCT coefficient with the value $$\frac{1}{8}\cos\left(\frac{5\pi}{16}\right) \text{ and } \frac{1}{8}\cos\left(\frac{7\pi}{16}\right)$$

stored in the second memory 5112, and it then respectively stores the two obtained products in the third register 5133 and the fourth register 5134.

When the 2-4-8 IDCT procedure is being performed, and when h is an even number, then $$C_{+x,z}^{h,u} \text{ and } C_{-x,z}^{h,u}$$

must both be selected from the combination $$\frac{(-1)^j}{8}\left\{1, \cos\left(\frac{4\pi}{16}\right), 0\right\},$$

or from the combination $$\frac{(-1)^j}{8}\left\{\cos\left(\frac{2\pi}{16}\right), \cos\left(\frac{6\pi}{16}\right)\right\}.$$

When the value is selected from the combination $$\frac{1}{8}\left\{1, \cos\left(\frac{4\pi}{16}\right), 0\right\},$$

the first multiplier 5121 multiplies the inputted DCT coefficient with the value $$\frac{1}{8}$$

stored in the first memory 5111, and it then stores the obtained product in the first register 5131. At this moment, the second multiplier 5122 multiplies the inputted DCT coefficient with the value $$\frac{1}{8}\cos\left(\frac{4\pi}{16}\right)$$

stored in the second memory 5112, and it then stores the obtained product in the third register 5133.

When the value is selected from the combination $$\frac{1}{8}\left\{\cos\left(\frac{2\pi}{16}\right), \cos\left(\frac{6\pi}{16}\right)\right\},$$

the first multiplier 5121 multiplies the inputted DCT coefficient with the value $$\frac{1}{8}\cos\left(\frac{2\pi}{16}\right)$$

stored in the first memory 5111, and it then stores the obtained product in the first register 5131. At this moment, the second multiplier 5122 multiplies the inputted DCT coefficient with the value $$\frac{1}{8}\cos\left(\frac{6\pi}{16}\right)$$

stored in the second memory 5112, and it then stores the obtained product in the third register 5133.

The multiplexer circuit 514 is used for selecting a corresponding value from the four products stored in the register device 513 and the constant 0, and then sending the value to the adder/subtractor 515. The adder/subtractor 515 is used for performing the summation or subtraction to the values from the multiplexer circuit 514, so as to further obtain the partial output data.

Comparing to prior arts, prior arts take lots of multiplications when performing the IDCT procedure because prior arts substitute all the DCT coefficients into calculation, one at a time; the present invention uses the simplified and symmetry characteristics of the trigonometric function to reduce the time when the system performs the IDCT procedure. In the meantime, the 8-8 and 2-4-8 IDCT of the present invention can be integrated into an integrated hardware; in comparison with prior arts, prior arts need two hardware to perform the 8-8 or 2-4-8 IDCT procedure. Therefore, the present invention not only saves enormous device cost but is also convenient to use.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data processing system for transforming an input matrix (A) with a set of transform coefficients through an inverse discrete cosine transform (IDCT) procedure, and then obtaining an output matrix (Y) correspondingly, the input matrix comprising discrete cosine transform (DCT) coefficients ($a_{h,u}$) in $2^N$ rows by $2^N$ columns, and being sequentially indexed by the row index (h, h=0~$2^N$-1) and the column index (u, u=0~$2^N$-1), the output matrix also comprising output data ($y_{x,z}$) in $2^N$ rows by $2^N$ columns, and being sequentially indexed by the row index (x, x=0~$2^N$-1) and the column index (z, z=0~$2^N$-1), and the output matrix being obtained by summing up a plurality of partial output matrixes, each partial output matrix comprising a first partial sub-output matrix and at least one other partial sub-output matrix, the first partial sub-output matrix comprising a plurality of partial output data having a predetermined symmetry characteristic, the partial output matrixes possessing a predetermined number of symmetry relations, the first partial sub-output matrixes and the other partial sub-output matrixes of each of the partial output matrixes having one of the predetermined number of symmetry relations, the data processing system comprising:

a system controller for providing a required set of control signals according to the row index (h) and the column index (u) of the selected DCT coefficients selected from the input matrix, and according to the row index (x) and the column index (z) of an output data to be generated;

a calculating unit for generating, based on the set of control signals, the selected DCT coefficients, and the IDCT procedure, a predetermined amount of partial output data of the first partial sub-output matrix;

a symmetry duplicator for calculating the rest of the partial output data of the first partial sub-output matrix from the predetermined amount of the partial output data obtained from the calculating unit according to the set of control signals and the symmetry characteristic; and a summation device, receiving the partial output data of the first partial sub-output matrixes of each partial output matrix, and determining the symmetry relation between the first partial sub-output matrix and the other partial sub-output matrixes according to the set of control signals, the summation device first respectively and cumulatively summing up all the first partial sub-output matrixes having the same symmetry relation, and correspondingly obtaining the predetermined amount of said summed partial sub-output matrixes and stored in a predetermined number of storage devices respectively, and then perform on the summed partial sub-output matrixes with a symmetry calculation procedure to obtain at least one sum of the partial sub-output matrix respectively, the summation device further summing up the predetermined amount of said sums of the partial sub-output matrixes to completely obtain the whole output matrix.

2. The data processing system of claim 1, wherein based on the selected DCT coefficients, the IDCT procedure and the mathematical translation relationship of product to sum formula of cosine function, the calculating unit generates the predetermined amount of partial output data of the first partial sub-output matrix.

3. The data processing system of claim 1, wherein the data processing system is an 8-8 IDCT system, and N=3, and the input matrix (A) comprises the DCT coefficients in eight rows by eight columns, and the output matrix (Y) comprises the output data in eight rows by eight columns as follows:

$$A = \begin{bmatrix} a_{0,0} & a_{0,1} & a_{0,2} & a_{0,3} & a_{0,4} & a_{0,5} & a_{0,6} & a_{0,7} \\ a_{1,0} & a_{1,1} & a_{1,2} & a_{1,3} & a_{1,4} & a_{1,5} & a_{1,6} & a_{1,7} \\ a_{2,0} & a_{2,1} & a_{2,2} & a_{2,3} & a_{2,4} & a_{2,5} & a_{2,6} & a_{2,7} \\ a_{3,0} & a_{3,1} & a_{3,2} & a_{3,3} & a_{3,4} & a_{3,5} & a_{3,6} & a_{3,7} \\ a_{4,0} & a_{4,1} & a_{4,2} & a_{4,3} & a_{4,4} & a_{4,5} & a_{4,6} & a_{4,7} \\ a_{5,0} & a_{5,1} & a_{5,2} & a_{5,3} & a_{5,4} & a_{5,5} & a_{5,6} & a_{5,7} \\ a_{6,0} & a_{6,1} & a_{6,2} & a_{6,3} & a_{6,4} & a_{6,6} & a_{6,6} & a_{6,7} \\ a_{7,0} & a_{7,1} & a_{7,2} & a_{7,3} & a_{7,4} & a_{7,5} & a_{7,6} & a_{7,7} \end{bmatrix},$$

$$Y = \begin{bmatrix} y_{0,0} & y_{0,1} & y_{0,2} & y_{0,3} & y_{0,4} & y_{0,5} & y_{0,6} & y_{0,7} \\ y_{1,0} & y_{1,1} & y_{1,2} & y_{1,3} & y_{1,4} & y_{1,5} & y_{1,6} & y_{1,7} \\ y_{2,0} & y_{2,1} & y_{2,2} & y_{2,3} & y_{2,4} & y_{2,5} & y_{2,6} & y_{2,7} \\ y_{3,0} & y_{3,1} & y_{3,2} & y_{3,3} & y_{3,4} & y_{3,5} & y_{3,6} & y_{3,7} \\ y_{4,0} & y_{4,1} & y_{4,2} & y_{4,3} & y_{4,4} & y_{4,5} & y_{4,6} & y_{4,7} \\ y_{5,0} & y_{5,1} & y_{5,2} & y_{5,3} & y_{5,4} & y_{5,5} & y_{5,6} & y_{5,7} \\ y_{6,0} & y_{6,1} & y_{6,2} & y_{6,3} & y_{6,4} & y_{6,6} & y_{6,6} & y_{6,7} \\ y_{7,0} & y_{7,1} & y_{7,2} & y_{7,3} & y_{7,4} & y_{7,5} & y_{7,6} & y_{7,7} \end{bmatrix},$$

wherein $$y_{x,z} = \sum_{h=0}^{7} \sum_{u=0}^{7} c(h)c(u) * a_{h,u} * \cos\left(\frac{(2x+1)}{16}h\pi\right) * \cos\left(\frac{(2z+1)}{16}u\pi\right)$$

and $$c(0) = \frac{1}{2\sqrt{2}}, \; c(n) = \frac{1}{2}, \; n \text{ is a natural number, wherein } n = 1 \sim 7.$$

4. The data processing system of claim 1, wherein the data processing system is a 2-4-8 IDCT system, and N=3, and the input matrix (A) comprises the DCT coefficients in eight rows by eight columns, and the output matrix (Y) comprises the output data in eight rows by eight columns as follows:

$$A = \begin{bmatrix} a_{0,0} & a_{0,1} & a_{0,2} & a_{0,3} & a_{0,4} & a_{0,5} & a_{0,6} & a_{0,7} \\ a_{1,0} & a_{1,1} & a_{1,2} & a_{1,3} & a_{1,4} & a_{1,5} & a_{1,6} & a_{1,7} \\ a_{2,0} & a_{2,1} & a_{2,2} & a_{2,3} & a_{2,4} & a_{2,5} & a_{2,6} & a_{2,7} \\ a_{3,0} & a_{3,1} & a_{3,2} & a_{3,3} & a_{3,4} & a_{3,5} & a_{3,6} & a_{3,7} \\ a_{4,0} & a_{4,1} & a_{4,2} & a_{4,3} & a_{4,4} & a_{4,5} & a_{4,6} & a_{4,7} \\ a_{5,0} & a_{5,1} & a_{5,2} & a_{5,3} & a_{5,4} & a_{5,5} & a_{5,6} & a_{5,7} \\ a_{6,0} & a_{6,1} & a_{6,2} & a_{6,3} & a_{6,4} & a_{6,6} & a_{6,6} & a_{6,7} \\ a_{7,0} & a_{7,1} & a_{7,2} & a_{7,3} & a_{7,4} & a_{7,5} & a_{7,6} & a_{7,7} \end{bmatrix},$$

$$Y = \begin{bmatrix} y_{0,0} & y_{0,1} & y_{0,2} & y_{0,3} & y_{0,4} & y_{0,5} & y_{0,6} & y_{0,7} \\ y_{1,0} & y_{1,1} & y_{1,2} & y_{1,3} & y_{1,4} & y_{1,5} & y_{1,6} & y_{1,7} \\ y_{2,0} & y_{2,1} & y_{2,2} & y_{2,3} & y_{2,4} & y_{2,5} & y_{2,6} & y_{2,7} \\ y_{3,0} & y_{3,1} & y_{3,2} & y_{3,3} & y_{3,4} & y_{3,5} & y_{3,6} & y_{3,7} \\ y_{4,0} & y_{4,1} & y_{4,2} & y_{4,3} & y_{4,4} & y_{4,5} & y_{4,6} & y_{4,7} \\ y_{5,0} & y_{5,1} & y_{5,2} & y_{5,3} & y_{5,4} & y_{5,5} & y_{5,6} & y_{5,7} \\ y_{6,0} & y_{6,1} & y_{6,2} & y_{6,3} & y_{6,4} & y_{6,6} & y_{6,6} & y_{6,7} \\ y_{7,0} & y_{7,1} & y_{7,2} & y_{7,3} & y_{7,4} & y_{7,5} & y_{7,6} & y_{7,7} \end{bmatrix},$$ wherein -continued $$y_{x,2g} = \sum_{h=0}^{7} \sum_{m=0}^{3} c(h)c(m) * [a_{h,m} + a_{h,m+4}] * \cos\left(\frac{(2x+1)}{16}h\pi\right) *$$

$$\cos\left(\frac{(2g+1)}{8}m\pi\right)$$

$$y_{x,2g+1} = \sum_{h=0}^{7} \sum_{m=0}^{3} c(h)c(m) * [a_{h,m} - a_{h,m+4}] * \cos\left(\frac{(2x+1)}{16}h\pi\right) *$$

$$\cos\left(\frac{(2g+1)}{8}m\pi\right)$$

and $c(0) = \frac{1}{2\sqrt{2}}$, $c(n) = 1/2$, $n$ is a natural number, wherein $n = 1 \sim 7$, $m$ and $g$ are natural numbers, wherein $m = 0 \sim 3$, $g = 0 \sim 3$.

5. The data processing system of claim 1, wherein the calculating unit comprises:
a memory device for storing the predetermined set of transform coefficients, and outputting the plurality of transform coefficients according to the set of control signals;
a multiplier circuit for multiplying the transform coefficients outputted from the memory device together with the selected DCT coefficients, and obtaining a plurality of product;
a register device for temporarily storing the product;
a multiplexer circuit for selecting a predetermined product from the register device; and
an adder/subtractor for performing the summation or subtraction to the predetermined product, so as to further obtain the partial output data.

6. The data processing system of claim 5, wherein the memory device comprises:
a first memory for storing the following four transform coefficients:

$$\frac{1}{8}, \frac{1}{8}\cos\left(\frac{\pi}{16}\right), \frac{1}{8}\cos\left(\frac{2\pi}{16}\right), \frac{1}{8}\cos\left(\frac{3\pi}{16}\right);$$

a second memory for storing the following four transform coefficients:

$$\frac{1}{8}\cos\left(\frac{4\pi}{16}\right), \frac{1}{8}\cos\left(\frac{5\pi}{16}\right), \frac{1}{8}\cos\left(\frac{6\pi}{16}\right), \frac{1}{8}\cos\left(\frac{7\pi}{16}\right).$$

7. The data processing system of claim 6, wherein the multiplier circuit comprises a first multiplier and a second multiplier, the register device comprises a first register, a second register, a third register, and a fourth register, the first register and the second register are connected to the first multiplier for temporarily storing the product calculated by the first multiplier, the third register and the fourth register are connected to the second multiplier for temporarily storing the product calculated by the second multiplier, the multiplexer circuit comprises a first multiplexer and a second multiplexer, the first multiplexer and the second multiplexer respectively select the product from the constant 0 and the four registers, and the adder/subtractor performs summation or subtraction on the product, so as to obtain the predetermined amount of partial output data.

8. The data processing system of claim 7, wherein when the present DCT coefficient inputted into the calculating unit is an 8-8 DCT coefficient, the first multiplier multiplies the one of the two following transform coefficients sets:

$$\frac{1}{8}\cos\left(\frac{\pi}{16}\right), \frac{1}{8}\cos\left(\frac{3\pi}{16}\right) \text{ or } \frac{1}{8}, \frac{1}{8}\cos\left(\frac{2\pi}{16}\right)$$

selected from the four transform coefficients stored in the first memory, together with the inputted DCT coefficient, and respectively stores the two obtained products in the first register and the second register; and the second multiplier multiplies the one of the two following transform coefficients sets:

$$\frac{1}{8}\cos\left(\frac{5\pi}{16}\right), \frac{1}{8}\cos\left(\frac{7\pi}{16}\right) \text{ or } \frac{1}{8}\cos\left(\frac{4\pi}{16}\right), \frac{1}{8}\cos\left(\frac{6\pi}{16}\right)$$

selected from the four transform coefficients stored in the second memory, together with the inputted DCT coefficient, and respectively stores the two obtained products in the third register and the fourth register.

9. The data processing system of claim 7, wherein when the present DCT coefficient inputted into the calculating unit is a 2-4-8 DCT coefficient with the row index (h) being an odd number, the first multiplier sequentially multiplies two transform coefficient $$\frac{1}{8}\cos\left(\frac{\pi}{16}\right) \text{ and } \frac{1}{8}\cos\left(\frac{3\pi}{16}\right)$$

selected from the four transform coefficients stored in the first memory together with the inputted DCT coefficient, and then respectively stores the two obtained products in the first register and the second register; the second multiplier sequentially multiplies two transform coefficient $$\frac{1}{8}\cos\left(\frac{5\pi}{16}\right) \text{ and } \frac{1}{8}\cos\left(\frac{7\pi}{16}\right)$$

selected from the four transform coefficients stored in the second memory together with the inputted DCT coefficient, and then respectively stores the two obtained products in the third register and the fourth register.

10. The data processing system of claim 7, wherein when the present DCT coefficient inputted into the calculating unit is a 2-4-8 DCT coefficient with the row index (h) being an even number, the first multiplier multiplies one of the two following transform coefficients:

$$\frac{1}{8} \text{ or } \frac{1}{8}\cos\left(\frac{2\pi}{16}\right)$$

selected in the four transform coefficients stored in the first memory together with the inputted DCT coefficient, and then stores the obtained product in the first register; the second multiplier sequentially multiplies multiplies one of the two following transform coefficients:

$$\frac{1}{8}\cos\left(\frac{4\pi}{16}\right) \text{ or } \frac{1}{8}\cos\left(\frac{6\pi}{16}\right)$$

selected in the four transform coefficients stored in the second memory together with the inputted DCT coefficient, and then stores the obtained product in the third register.

11. The data processing system of claim 1, wherein the output matrix (Y) is obtained by summing up 64 partial output matrixes ($Y^{h,u}$, h=0~7, u=0~7), and each partial output matrix comprises four partial sub-output matrixes ($Y_A^{h,u}$, $Y_B^{h,u}$, $Y_C^{h,u}$, and $Y_D^{h,u}$), wherein $Y_A^{h,u}$ is the first partial sub-output matrix, $Y_B^{h,u}$, $Y_C^{h,u}$, and $Y_D^{h,u}$ are the other partial sub-output matrixes, and $Y_A^{h,u}$, $Y_B^{h,u}$, $Y_C^{h,u}$, and $Y_D^{h,u}$ are listed as follows:

$$Y_A^{h,u} = \begin{bmatrix} y_{0,0}^{h,u} & y_{0,1}^{h,u} & y_{0,2}^{h,u} & y_{0,3}^{h,u} \\ y_{1,0}^{h,u} & y_{1,1}^{h,u} & y_{1,2}^{h,u} & y_{1,3}^{h,u} \\ y_{2,0}^{h,u} & y_{2,1}^{h,u} & y_{2,2}^{h,u} & y_{2,3}^{h,u} \\ y_{3,0}^{h,u} & y_{3,1}^{h,u} & y_{3,2}^{h,u} & y_{3,3}^{h,u} \end{bmatrix},$$

$$Y_B^{h,u} = \begin{bmatrix} y_{0,4}^{h,u} & y_{0,5}^{h,u} & y_{0,6}^{h,u} & y_{0,7}^{h,u} \\ y_{1,4}^{h,u} & y_{1,5}^{h,u} & y_{1,6}^{h,u} & y_{1,7}^{h,u} \\ y_{2,4}^{h,u} & y_{2,5}^{h,u} & y_{2,6}^{h,u} & y_{2,7}^{h,u} \\ y_{3,4}^{h,u} & y_{3,5}^{h,u} & y_{3,6}^{h,u} & y_{3,7}^{h,u} \end{bmatrix},$$

$$Y_C^{h,u} = \begin{bmatrix} y_{4,0}^{h,u} & y_{4,1}^{h,u} & y_{4,2}^{h,u} & y_{4,3}^{h,u} \\ y_{5,0}^{h,u} & y_{5,1}^{h,u} & y_{5,2}^{h,u} & y_{5,3}^{h,u} \\ y_{6,0}^{h,u} & y_{6,1}^{h,u} & y_{6,2}^{h,u} & y_{6,3}^{h,u} \\ y_{7,0}^{h,u} & y_{7,1}^{h,u} & y_{7,2}^{h,u} & y_{7,3}^{h,u} \end{bmatrix}, \text{ and}$$

-continued $$Y_D^{h,u} = \begin{bmatrix} y_{4,4}^{h,u} & y_{4,5}^{h,u} & y_{4,6}^{h,u} & y_{4,7}^{h,u} \\ y_{5,4}^{h,u} & y_{5,5}^{h,u} & y_{5,6}^{h,u} & y_{5,7}^{h,u} \\ y_{6,4}^{h,u} & y_{6,5}^{h,u} & y_{6,6}^{h,u} & y_{6,7}^{h,u} \\ y_{7,4}^{h,u} & y_{7,5}^{h,u} & y_{7,6}^{h,u} & y_{7,7}^{h,u} \end{bmatrix}.$$

12. The data processing system of claim 11, wherein the partial output matrixes possess four kinds of symmetry relations, and the summation device respectively and cumulatively sums up the first partial sub-output matrixes which have the same symmetry relation, so as to obtain four summed partial sub-output matrixes.

13. The data processing system of claim 12, wherein said four summed partial sub-output matrixes are expressed as $Y_{A1}$, $Y_{A2}$, $Y_{A3}$, and $Y_{A4}$ respectively, and the formulae of the symmetry calculation procedure, for respectively obtaining at least one sum of the partial sub-output matrixes, is as follows:

$$\begin{bmatrix} Y_A \\ Y_B \\ Y_C \\ Y_D \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} Y_{A1} \\ Y_{A2} \\ Y_{A3} \\ Y_{A4} \end{bmatrix};$$

wherein the $Y_A$, $Y_B$, $Y_C$, and $Y_D$ are respectively the total sums of all the 64 first partial output matrix ($Y_A^{h,u}$, h=0~7, u=0~7) and all the 64 other partial sub-output matrixes ($Y_B^{h,u}$, $Y_C^{h,u}$, and $Y_D^{h,u}$, h=0~7, u=0~7).

14. The data processing system of claim 13, wherein the relation between the output matrix (Y) and said four sums of the partial sub-output matrixes ($Y_A$, $Y_B$, $Y_C$, and $Y_D$) is as follows:

$$Y = \begin{bmatrix} Y_A & Y_B \\ Y_C & Y_D \end{bmatrix}.$$

* * * * *